Figure 1:
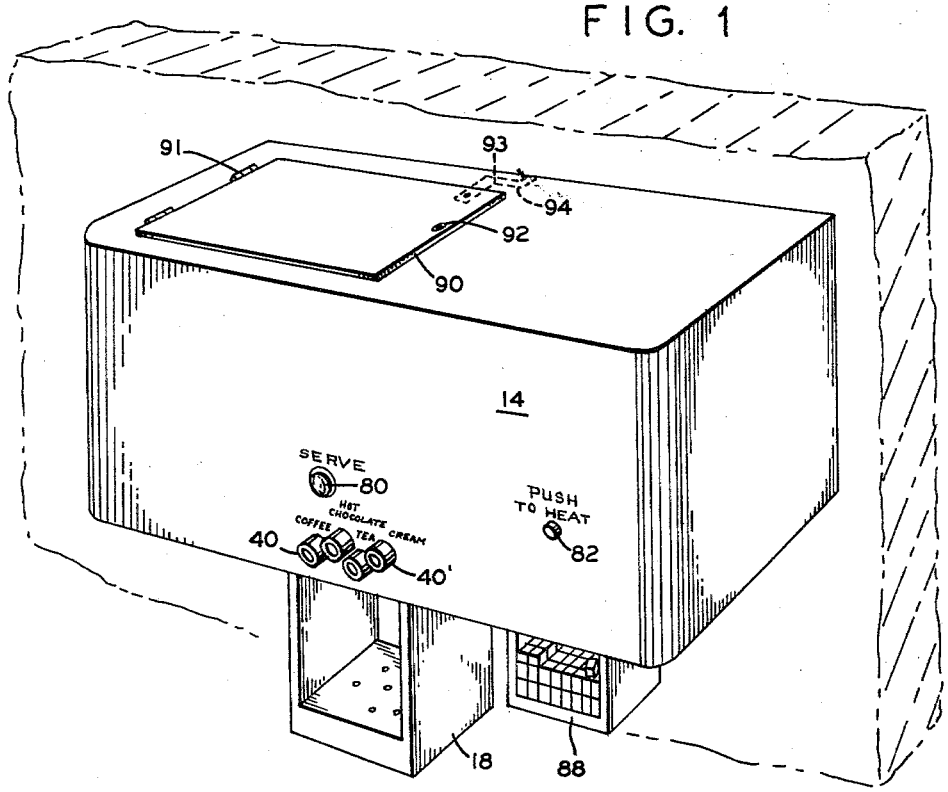

July 20, 1965 T. GEFFNER 3,195,588
BEVERAGE DISPENSING MACHINE
Filed May 22, 1962 4 Sheets-Sheet 1

INVENTOR.
TED GEFFNER
BY John P. Chandler
HIS ATTORNEY.

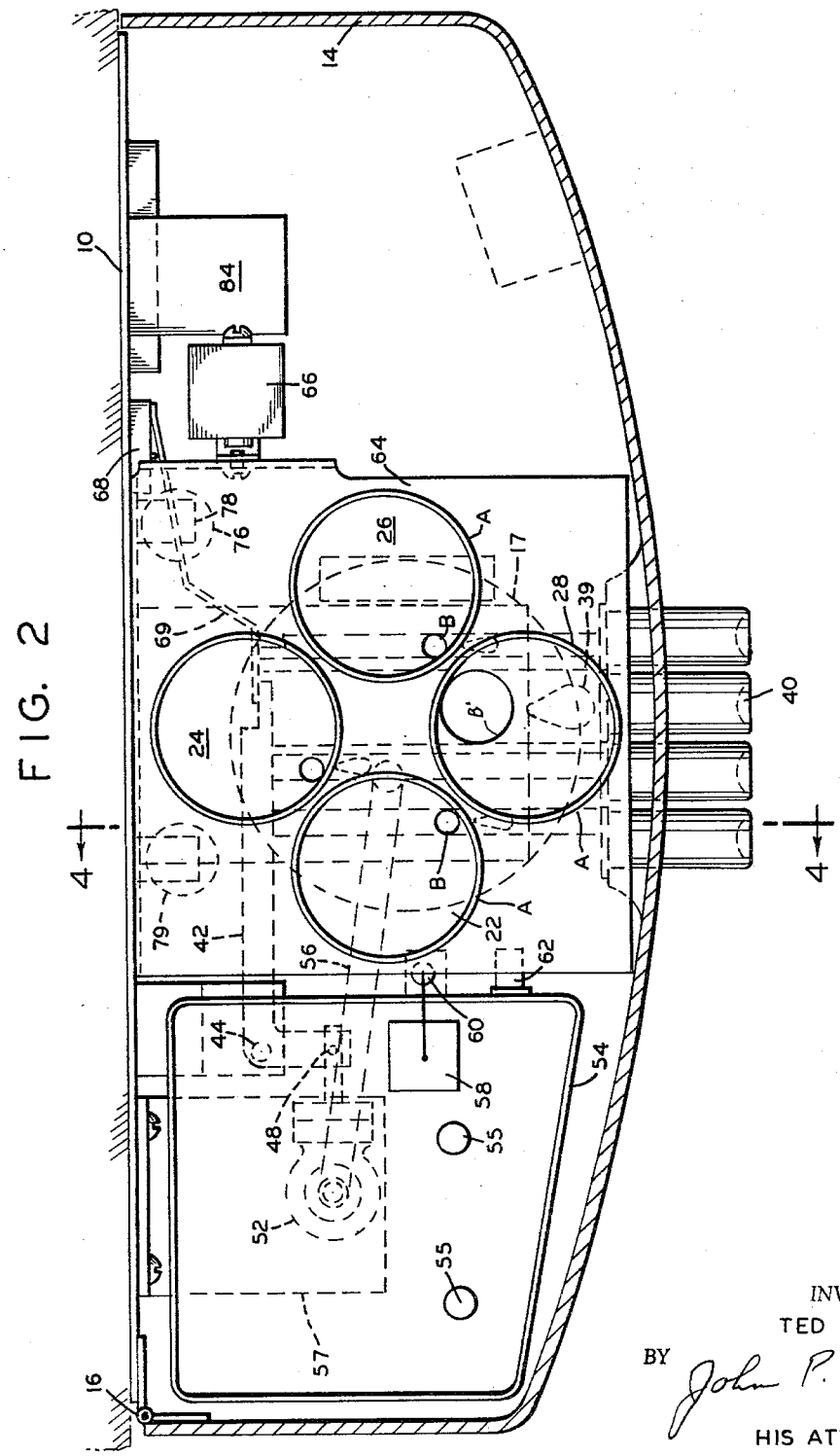

July 20, 1965

T. GEFFNER 3,195,588

BEVERAGE DISPENSING MACHINE

Filed May 22, 1962

4 Sheets-Sheet 3

INVENTOR.
TED GEFFNER
BY John P. Chandler
HIS ATTORNEY.

July 20, 1965

T. GEFFNER 3,195,588

BEVERAGE DISPENSING MACHINE

Filed May 22, 1962

4 Sheets-Sheet 4

INVENTOR.
TED GEFFNER
BY John P. Chandler
HIS ATTORNEY.

3,195,588
BEVERAGE DISPENSING MACHINE
Ted Geffner, East Merrick, N.Y., assignor to Hospitality House, Inc., New York, N.Y., a corporation of New York
Filed May 22, 1962, Ser. No. 196,749
2 Claims. (Cl. 141—104)

This invention relates to beverage dispensing machines and in particular to an apparatus useful for dispensing a variety of individual portions such as cups of coffee, tea, and the like.

Most of the prior devices, such as coffee dispensing machines, use a premixed syrup in concentrated form, which is added to hot water when dispensed into a cup. A complicated piping system is necessary in the syrup dispensing devices which has an inherent disadvantage of becoming clogged and also entails difficulty in cleaning.

It is an object, therefore, to provide a beverage dispensing device wherein the beverage is stored in powdered form from which it is dispensed into a cup and hot water simultaneously added.

A further object is to provide a device of simple construction and ease of operation, which also can be serviced with the least amount of effort.

Still another object is to provide a beverage dispensing device having a variety of beverages contained within a very compact area.

A further object is to provide a beverage dispensing device which can be attached to a wall and thereby conserving space. This is particularly useful in office, motel and hotel rooms or similar places.

One feature of the invention includes a plurality of hoppers for storing a variety of powdered beverages such as coffee, chocolate, etc. Each hopper is provided with an opening and is movable to dispense a quantity of powder from the hopper into a cup which is placed below. An electrically heated tank of water is provided within the device to dispense water into the cup. An electrically operated agitating member transmits vibrations to the hoppers to shake the powder to the bottom. A push button, for manual operation, is attached to each metering member and interconnected to the water supply for operating each simultaneously. Cream is also provided in a dispenser, which can be added to the beverage in the cup, if desired, by pressing a separate button. A bracket is provided below the hopper openings for receiving a cup.

A novel circuit has a number of switches including one which is closed upon depressing any push button in order to actuate the agitator and another switch which is opened when a float valve indicates that the water tank is empty. This latter switching means discontinues operation of the other components of the system.

Figure 6:
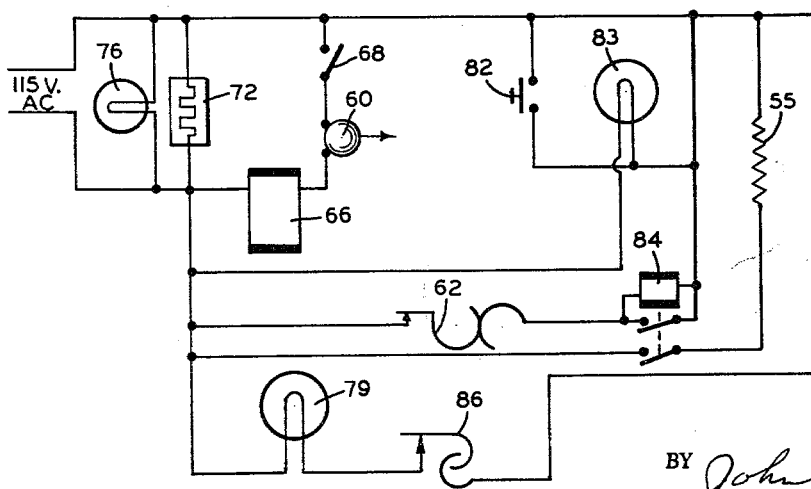
Figure 3:
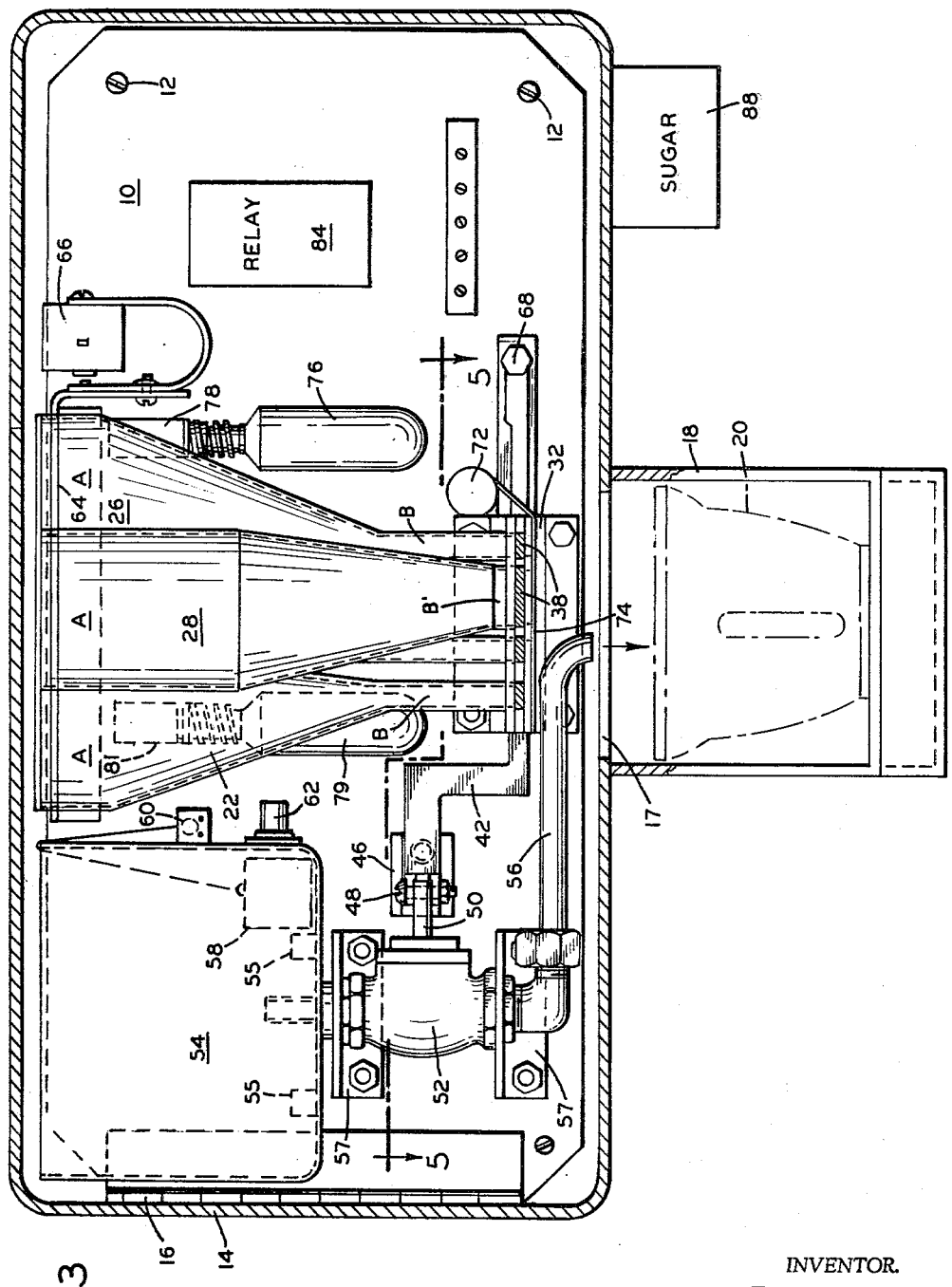

For better understanding of the present invention, together with other and further objects thereof, reference is had to the following description together with the accompanying drawings wherein:

FIG. 1 is a perspective view of the present invention.
FIG. 2 is a plan view of the device.
FIG. 3 is a front elevational view with cover cut away.
FIG. 4 is a sectional view taken along 4—4 of FIG. 2.
FIG. 5 is a sectional view taken along 5—5 of FIG. 3.
FIG. 6 is a schematic of the circuit used in the present device.

Referring now to the drawings, a vertically extending frame or mounting plate 10 supports the components of the device in a manner projecting from one side of the plate to leave the opposite side clear of obstruction for attaching to a wall by any convenient means, such as screws 12. A generally rectangular housing 14 surrounds the remaining five sides of the device and is attached to the mounting plate 10 by a hinge 16 for each access to the inner components. The housing is provided with a depending bracket 18 to receive a cup 20 into which a beverage can be dispensed. An opening 17 in the housing 14 is positioned above the cup 20 to allow the material to pass therethrough.

There are four hoppers 22, 24, 26 and 28 for storing the powdered beverage material. These hoppers have a cylindrical upper section A which tapers to a small cylindrical section B at its lower end. Each of the lower ends B is received in an opening 30 in a plate 32 to which it is secured for support. These lower ends are located in an area above the cup. Plate 32 is attached at one end to the mounting plate 10 and projects normal thereto and extends to a point spaced apart from the front wall 15 of housing 14. The plate 32 is provided with a slotted opening 36 to slidably receive a metering plate 38 for each of the hoppers. This metering plate is provided with an opening 39 to allow passage of material out of the hoppers through openings 30 in the plate 32, when the metering plate 38 is moved into a position where the opening 39 is in alignment with the opening 30.

Each of the metering plates normally projects from the plate 32 to contact a push button 40. One push button 40' is used for dispensing powdered cream only. The free end of the metering plates 38 contacts an enlarged portion 36A of the slot 36 in the plate 32. The lever 42 pivots at 44 in a block 46 which is attached to the side plate 10. The free end of the lever 42 is attached at 48 to rod 50 of a hydraulic metering valve 52 which is connected to a water tank 54 at its upper end, and at its lower end to an outlet pipe 56 which extends above the opening 17 in the cover 14 to dispense water into the cup 20. All of these elements, namely, valve 52, tank 54, and pipe 56 are supported upon two brackets 57 extending from the mounting plate 10. Water in the tank is electrically heated by heating units 55. A float 58 within the tank 54 operates a switch 60 to open the circuit and de-energize the agitator 66 when tank 54 becomes empty. None of the powdered material flows out of the hoppers if the agitator is de-energized. A thermostat 62 is also attached to the tank 54 to control the temperature of the water. When the water is hot this switch opens the circuit for heating element 55 and light 83.

The upper sections A of the hoppers are supported by a horizontal plate 64 extending forwardly from the mounting plate 10. At one end, plate 64 is attached to an electric agitator 66 from which it receives vibrating impulses to agitate the contents of the hoppers and encourage free flow of the powdered material. This agitator may be a motor with an eccentric cam or it may be a simple electro-magnetic vibrator. A microswitch 68 is actuated by lever 69 which is in turn operated by the lever 42 when any one of the push buttons 40 or 40' are pressed, moving the arms 42 and 69 into dotted positions best shown in FIG. 5. It will be noted that push button 40' actuates lever 69 without imparting movement to lever 42. A spring 70 enclosed in the block 46 presses against the lever 42 to return it and consequently the push buttons 40 to their original positions and also to allow the metering valve 52 to close. A heating element 72 is carried adjacent the plate 32 and is connected to a copper strip 74 which is attached to the underside of the plate 32 for raising the temperature of the plate 32 sufficiently to prevent the collection of moisture. A lamp 76 is supported in a bracket 78 on the mounting plate 10 and serves the purpose of heating the surrounding area to prevent moisture collection. A lamp 79 is also supported in a bracket 81 on the mounting plate 10 for the purpose of illuminating a window 80 when the beverage is ready to serve. Lamp 79 further serves to illuminate the area in which cup 20 is located.

In operation, the hoppers within the housing are filled with the powdered concentrates for the respective beverages which are indicated on the front of the housing 14 such as coffee, tea, etc. The hopper connected with the button 40′ labeled "cream" can be filled with powdered cream. The water tank is also filled and the electrical circuit connected to a suitable power source such as 115 volts A.C. (FIG. 6). This energizes the heater element 72 which in turn warms the plate 74 and also energizes the heating lamp 76. A momentary push button switch 82 having light 83 in its circuit is depressed, energizing a holding relay 84 which in turn energizes the tank heaters 55 and light 83 and the thermostatic switch 62 to heat the water in the tank to a predetermined temperature which is controlled by the thermostatic switch 62. When the water has been heated to the proper temperature a second thermostatic switch 86, which is normally open, is closed by the increased temperature and energizes the lamp 79 which lights the window 80 indicating "serve" and also illuminating the area in which the cup is to be placed.

After placing the cup 20 in the bracket 18 one of the buttons 40, representing the selected beverage, is pressed. This in turn moves the metering plate 38 inwardly to bring the opening 39 in alignment with the opening 30 in the plate 32, thus allowing the contents of the hopper to drop into the cup 20 below. At the same time the free end of the metering plate 38 moves lever 42 about pivot point 44 into position D (FIGS. 4 and 5), thus actuating rod 50 to operate the valve 52 and deliver hot water through the pipe 56 and into the cup 20. Also the lever 59 is operated by the lever 42 which actuates the microswitch 68 which in turn energizes the agitator 66 and consequently vibrating the hoppers to cause the powdered beverage concentrate to drop through the opening 30. It will become apparent that due to the interconnection between the levers described above the water is delivered into the cup substantially simultaneously with the powdered concentrate. When the cup is full the button 40 is released thereby cutting off the flow of ingredients and water into the cup. If it is desired to add cream the button 40′ which is labeled "cream" is depressed which opens the metering port of the hopper for this powdered material and also actuates the lever 69 and microswitch 68 to energize the agitator 66 for shaking the powdered cream into the cup. Since the act of depressing button 40′ does not move lever 42 no water flows during this time. When sufficient cream has been metered the button 40′ is released to shut off the flow and the cup is then removed from the bracket 18. If sugar is desired it is made available in an adjacent compartment 88 in which lump sugar is stored.

To secure a full cup of beverage the desired push button 40 is depressed its entire distance and this effects full opening of valve 52 so that volume of hot water flows at its maximum. The same is true of the delivery rate of flow of the powdered beverage material. The user keeps an eye on the cup and when it is filled the button is released. If he desires less than a full cup the valve is held open a shorter time and during this shortened period of flow of water there is delivered a proportionally smaller quantity of the beverage material.

In actual practice, however, it has been found that the person desiring only half a cup does not depress the button 40 to its full distance of inward travel. In order to effectively reduce the flow of the powdered material under these conditions the openings 39 in plates 38 have been shaped with the narrowed forward end sections shown. In this connection it may be pointed out that the reason for the larger opening B′ at the lower end of hopper 28 is that some beverages such as hot chocolate require a larger quantity of the powdered mixture.

The hoppers can be serviced through a top wall opening (not shown) which is closed as by a door 90 hinged at 91 and locked at 92, as shown in FIG. 1. The housing is retained closed by any suitable means such as a pivoted latch 93 which engages a keeper 94 on the mounting plate. Thus, when the door 90 has been opened by an authorized attendant the latch is exposed and can be manipulated, freeing the housing for swinging on its hinges 16.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. Apparatus for dispensing instant liquid beverages comprising a frame, a plurality of hoppers for powdered beverage materials supported by the frame, a support for a cup carried by the frame, the lower ends of the hoppers being located in communication with the cup, a manually slidable metering plate having an aperture alignable with each hopper to permit gravity flow of the powdered materials into the cup, electrical means for agitating the hoppers, and a hot water tank having a metering valve and a conduit leading therefrom, said valve and said plate having means to deposit water in said cup upon movement of the plate and having means wherein the quantity of material and water so deposited is dependent upon the manual extent of movement of the plate.

2. Apparatus for dispensing instant liquid beverages into a cup which is positioned below the apparatus and comprising a frame, a plurality of hoppers for powdered beverage materials supported by the frame, the lower ends of the hoppers being located in an area adjacent the cup, a manually slidable metering plate having an aperture alignable with each hopper to permit gravity flow of the powdered material into the cup, means for agitating the hoppers to promote flow of the materials, and a hot water tank having a metering valve and a conduit leading therefrom, said valve and said plate having means to deposit water in said cup upon movement of the plate and having means wherein the quantity of material so deposited is dependent upon the manual extent of movement of the plate.

References Cited by the Examiner

UNITED STATES PATENTS

| | | | |
|---|---|---|---|
| 2,298,957 | 10/42 | Mazzarelli | 222—561 XR |
| 2,387,871 | 10/45 | Baumann. | |
| 2,614,738 | 10/52 | Mills. | |
| 2,755,000 | 7/56 | Parre | 222—129.4 |
| 2,814,317 | 11/57 | Gale | 222—129.4 XR |
| 2,972,434 | 2/61 | James | 222—66 |
| 2,975,937 | 3/61 | Totten | 222—76 XR |
| 2,980,140 | 4/61 | McMillan | 137—637 |
| 3,088,490 | 5/63 | Rockwood et al. | 137—637 |

FOREIGN PATENTS

| | | |
|---|---|---|
| 339,103 | 12/30 | Great Britain. |
| 464,003 | 4/37 | Great Britain. |

LAVERNE D. GEIGER, *Primary Examiner.*

LOUIS J. DEMBO, *Examiner.*